(12) United States Patent
Schwaiger et al.

(10) Patent No.: US 11,385,050 B2
(45) Date of Patent: Jul. 12, 2022

(54) POSITION-MEASURING DEVICE AND METHOD FOR OPERATING A POSITION-MEASURING DEVICE

(71) Applicant: DR. JOHANNES HEIDENHAIN GmbH, Traunreut (DE)

(72) Inventors: Werner Schwaiger, Bergen (DE); Gregor Rosenegger, Uebersee (DE); Andreas Mitterer, Haag (DE); Ludwig Schmidt, Traunreut (DE); Erich Strasser, Trostberg (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 284 days.

(21) Appl. No.: 16/655,258

(22) Filed: Oct. 17, 2019

(65) Prior Publication Data

US 2020/0124415 A1    Apr. 23, 2020

(30) Foreign Application Priority Data

Oct. 19, 2018  (DE) .......................... 102018217934.4

(51) Int. Cl.
   *G01B 21/22*   (2006.01)
(52) U.S. Cl.
   CPC .................... *G01B 21/22* (2013.01)
(58) Field of Classification Search
   None
   See application file for complete search history.

(56) References Cited

U.S. PATENT DOCUMENTS

| 4,294,121 A | * | 10/1981 | Inoue | G01B 3/008 73/662 |
| 4,491,928 A | * | 1/1985 | Reichl | G01B 7/30 702/161 |
| 4,663,851 A | * | 5/1987 | Feichtinger | G01D 5/3473 33/1 PT |

(Continued)

FOREIGN PATENT DOCUMENTS

| DE | 19751853 A1 | 6/1998 |
| DE | 102016224012 A1 | 6/2018 |

(Continued)

*Primary Examiner* — Lina M Cordero
(74) *Attorney, Agent, or Firm* — Leydig, Voit & Mayer, Ltd.

(57) ABSTRACT

A position-measuring device includes a graduation carrier which is non-rotatably connectable to a shaft and has a measuring graduation that is disposed radially about an axis of rotation of the shaft in a mounted state of the graduation carrier. A first scanner is configured to generate position signals by scanning the measuring graduation. A position-processor is configured to process the position signals into absolute, digital position values. An interface is configured to communicate with subsequent electronics. A second scanner is configured to generate measurement signals that are dependent on a position of a machine part by scanning a measurement target on the machine part. An analyzer is configured to process the measurement signals into a measurement value indicative of a position and/or a change in the position of the measurement target relative to the second scanner, and to output the measurement value to the interface.

12 Claims, 7 Drawing Sheets

(56) References Cited

U.S. PATENT DOCUMENTS

| | | | | |
|---|---|---|---|---|
| 5,198,763 | A * | 3/1993 | Konishi | G01B 7/02 |
| | | | | 324/207.25 |
| 6,111,402 | A | 8/2000 | Fischer | |
| 9,347,764 | B2 * | 5/2016 | Gilmore | G01B 7/14 |
| 2002/0125884 | A1 * | 9/2002 | Wendt | G01B 7/003 |
| | | | | 324/207.24 |
| 2004/0027116 | A1 * | 2/2004 | Gester | G01L 3/105 |
| | | | | 324/207.16 |
| 2005/0275568 | A1 * | 12/2005 | Madni | G01D 5/2053 |
| | | | | 341/50 |
| 2009/0095892 | A1 | 4/2009 | Summers et al. | |
| 2013/0015844 | A1 * | 1/2013 | Bogos | G01D 18/001 |
| | | | | 324/207.2 |
| 2014/0077795 | A1 * | 3/2014 | Oberhauser | G01D 5/24438 |
| | | | | 324/207.25 |
| 2015/0088450 | A1 * | 3/2015 | Beaury | G01D 5/244 |
| | | | | 702/122 |
| 2015/0115940 | A1 * | 4/2015 | Haible | G01D 5/2455 |
| | | | | 324/207.23 |
| 2015/0149101 | A1 * | 5/2015 | Von Berg | G01R 31/382 |
| | | | | 702/63 |
| 2015/0362335 | A1 * | 12/2015 | Spitzer | G01D 5/2454 |
| | | | | 310/68 B |
| 2018/0058884 | A1 * | 3/2018 | Rees | G01B 11/007 |
| 2018/0159405 | A1 | 6/2018 | Strasser | |
| 2019/0250018 | A1 * | 8/2019 | Zhao | G01D 5/145 |
| 2020/0158538 | A1 * | 5/2020 | Buchenau | G01D 5/145 |

FOREIGN PATENT DOCUMENTS

| | | |
|---|---|---|
| JP | H 1151702 A | 2/1999 |
| JP | 2001201362 A | 7/2001 |

* cited by examiner

POSITION-MEASURING DEVICE AND METHOD FOR OPERATING A POSITION-MEASURING DEVICE

CROSS-REFERENCE TO PRIOR APPLICATION

Priority is claimed to German Patent Application No. DE 10 2018 217 934.4, filed on Oct. 19, 2018, the entire disclosure of which is hereby incorporated by reference herein.

FIELD

The present invention relates to a position-measuring device, and to a method for operating such a position-measuring device.

BACKGROUND

In automation technology, it is common to use position-measuring devices which measure the angular position of shafts and/or the number of revolutions made by shafts. Such position-measuring devices are also referred to as rotary encoders or angle-measuring devices. The shafts to be measured may be motor shafts of electric motors or shafts of other rotating machine components. For measurement purposes, a rotary encoder includes a graduation carrier having a measuring graduation, as well as a scanning device which detects and analyzes rotational movements of the measuring graduation. The graduation carrier is disk-shaped or annular and non-rotatably connected to the shaft to be measured so that it rotates therewith. The scanning device, on the other hand, is fixedly connected to a machine component, such as a housing, opposite the graduation carrier. The position measurement may be based on different physical scanning principles, such as optical, magnetic, inductive or capacitive scanning principles. DE 197 51 853 A1, for example, describes a position-measuring device that operates according to the inductive measurement principle.

In order to ensure, to the extent possible, that the scanning signals measured by the scanning device are dependent only on the rotational movement, the scanning distance between the scanning device and the measuring graduation, which also affects the scanning signals, is attempted to be kept constant.

Often, movable mechanical components whose position is monitored by additional sensors are disposed in the immediate vicinity of the installed position of a position-measuring device. These sensors may be linear position-measuring devices for measuring linear displacements or proximity sensors for determining the distance between two machine components. A typical example of this are motor brakes, which are used in an electric drive to mechanically decelerate or prevent rotational movements. Here, braking is effected by pressing a movable machine part (armature plate) with a force against a brake disk which is also non-rotatably connected to the shaft to be braked. The braking effect is produced by the resulting friction. At the friction surfaces, there is disposed a brake lining, which wears out over time. By determining the position of the armature plate, it is possible to determine whether the brake is in an actuated condition or in an unactuated (released) condition, and to draw conclusions about the thickness of the brake pads. The latter is important in order to be able to replace the brake linings early during maintenance of the machine.

DE 10 2016 224 012 A1 describes an approach for determining the condition of the brake and the thickness of the brake linings using a position-measuring device. Here, the armature plate is moved along with the position-measuring device, so that the scanning distance; i.e. the distance between the scanning device and the graduation carrier, changes during actuation of the brake. This leads to a change in the amplitude of the position signals, and this change can in turn be used to infer the condition of the brake therefrom. However, it is often not desired for the position-measuring device to be movably mounted because, as mentioned above, the amplitudes of the scanning signals should preferably be kept constant.

SUMMARY

In an embodiment, the present invention provides a position-measuring device. The position-measuring device includes a graduation carrier which is non-rotatably connectable to a shaft and has a measuring graduation that is disposed radially about an axis of rotation of the shaft in a mounted state of the graduation carrier. A first scanner is configured to generate position signals by scanning the measuring graduation. A position-processor is configured to process the position signals into absolute, digital position values. An interface is configured to communicate with subsequent electronics. At least one second scanner is configured to generate measurement signals that are dependent on a position of a machine part by scanning a measurement target on the machine part. An analyzer is configured to process the measurement signals into at least one measurement value indicative of a position and/or a change in the position of the measurement target relative to the at least one second scanner, and to output the at least one measurement value to the interface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a device that allows measuring the position of a machine part in the vicinity of a position-measuring device without adding much complexity.

For this purpose, there is provided a position-measuring device including:
- a graduation carrier which is non-rotatably connectable to a shaft and has a measuring graduation that is disposed radially about an axis of rotation of the shaft when the graduation carrier is in the mounted condition,
- a scanning unit for generating position signals by scanning the measuring graduation,
- a position-processing unit for processing the position signals into absolute, digital position values,
- an interface unit for communicating with subsequent electronics, the position-measuring device further including:
- at least one second scanning unit for generating measurement signals that are dependent on a position of a machine part by scanning a measurement target on the machine part,
- an analyzing unit for processing the measurement signals into at least one measurement value indicative of a position or/and a change in position of the measurement target relative to the second scanning unit, and for outputting the at least one measurement value to the interface unit.

Another embodiment of the present invention provides a method that allows measuring the position of a machine part in the vicinity of a position-measuring device without adding much complexity.

For this purpose, there is provided a method for operating a position-measuring device including:
- a graduation carrier which is non-rotatably connected to a shaft and has a measuring graduation that is disposed radially about an axis of rotation of the shaft when the graduation carrier is in the mounted condition,
- a scanning unit which is used to generate position signals by scanning the measuring graduation,
- a position-processing unit in which the position signals are processed into absolute, digital position values,
- an interface unit for communicating with subsequent electronics, the position-measuring device further including:
- at least one second scanning unit which is used to generate measurement signals that are dependent on a position of a machine part by scanning a measurement target on the machine part,
- an analyzing unit which is used to process the measurement signals into at least one measurement value indicative of a position or/and a change in position of the measurement target relative to the second scanning unit, and to output the at least one measurement value to the interface unit.

In the following description of preferred embodiments, reference numerals introduced and described in one figure are retained in other figures. Reference numerals which occur multiple times but perform the same functions are extended by a number where appropriate.

Figure 1:
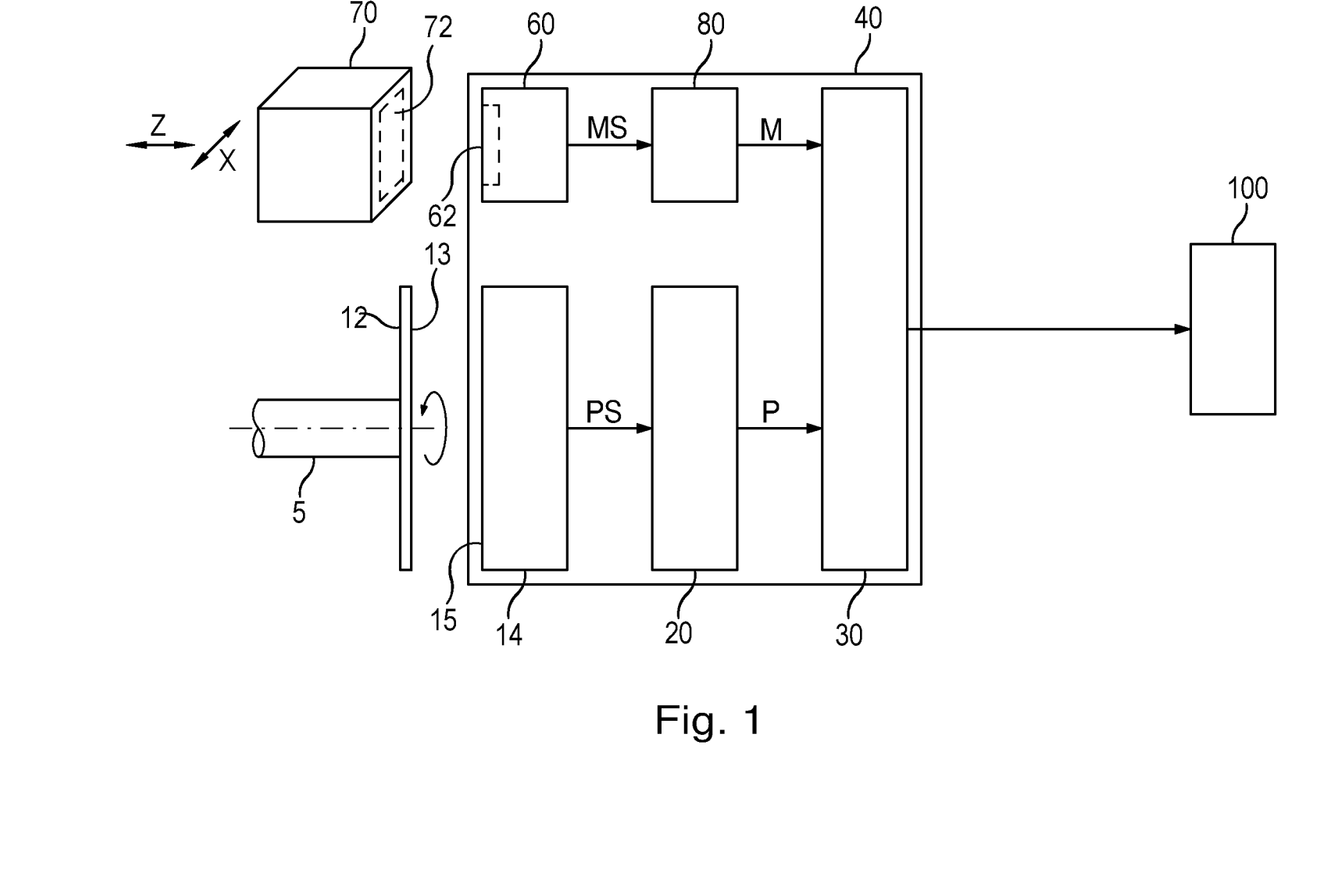
FIG. 1 shows a block diagram of a position-measuring device according to an embodiment of the present invention.

FIG. 1 shows a block diagram of a position-measuring device according to the present invention. In order to perform its basic function, namely, to determine the angular position of a shaft 5 and/or the number of revolutions made by it, the position-measuring device includes a graduation carrier 12 having a measuring graduation 13, a scanning unit 14 including sensor elements 15, a position-processing unit 20, as well as an interface unit 30.

Graduation carrier 12 is disk-shaped or annular, and measuring graduation 13 is disposed radially about a center of rotation of the disk. To permit operation of the position-measuring device, graduation carrier 12 is non-rotatably connected to shaft 5 so that measuring graduation 13 rotates with shaft 5.

Shaft 5 may be part of the position-measuring device and may be connected via a suitable mechanical coupling to a machine shaft (motor shaft) in a particular application. However, shaft 5 may also be the machine shaft (motor shaft) itself, whose angular position and/or number of revolutions are to be measured. In this case, the shaft does not form part of the position-measuring device.

Scanning unit 14 is disposed opposite the graduation carrier 12 for scanning measuring graduation 13. The basic principle of the position measurement is based on the angle-dependent variation of a physical quantity or property caused by measuring graduation 13. Detection is accomplished by sensor elements 15, which are designed according to the physical scanning principle. In the case of an optical scanning principle, for example, sensor elements 15 are photodetectors; in the case of an inductive scanning principle, they are receiver coils; in the case of a magnetic scanning principle, they are magnetic field sensors (Hall-effect sensors, MR sensors, . . . ); and in the case of a capacitive scanning principle, they are capacitor electrodes, for example. Position signals PS obtained by scanning the measuring graduation 13 with sensor elements 15 contain information on the angular position of shaft 5. Position signals PS are fed to position-processing unit 20, where they are processed into absolute, digital position values (angle values) P.

Position values P are fed to interface unit 30. Interface unit 30 is a digital data interface, in particular a serial interface, which allows the position-measuring device to communicate with sequence electronics 100. To this end, interface unit 30 is connectable to a corresponding interface of subsequent electronics 100. Advantageously, interface unit 30 is configured as a bidirectional interface, so that commands and possibly data can be transmitted from subsequent electronics 100 to the position-measuring device and measured data can be transmitted from the position-measuring device to subsequent electronics 100.

Position measurement can be accomplished using various physical measurement principles known to those skilled in the art, such as, for example, optical, inductive, magnetic or capacitive measurement principles.

In accordance with the present invention, the position-measuring device further includes at least one second scanning unit 60 and an analyzing unit 80.

Second scanning unit 60 is configured for generating measurement signals MS which are dependent on a position of a machine part 70. Measurement signals MS are acquired by scanning a measurement target 72 on machine part 70 with suitable sensor elements 62. Machine part 70 may itself be used as a measurement target 72, in particular a physical property of the side of machine part 70 facing second scanning unit 60. As will be illustrated later, advantageous embodiments of the present invention are obtained when a separate element disposed on the side of machine part 70 facing second scanning unit 60 is used as a measuring target 72.

Scanning can be done using any physical scanning principle, such as, in particular, optical, magnetic, inductive or capacitive scanning principles. The selected scanning principle determines the design of measurement target 72 and second scanning unit 60.

In the following, the term "scanning unit" always refers to the functional unit on which are disposed the sensor elements for detecting a position-dependent change in the quantity determined by the physical scanning principle. In addition, scanning units may further include the components that are used for producing this quantity.

For instance, when an optical scanning principle is used, then second scanning unit 60 includes, as a sensor element 62, a photodetector (photodiode) which detects light reflected from measurement target 72. The light is emitted from a light source (LED or laser diode) toward measurement target 72. In this case, measurement target 72 has light-reflecting properties.

If a magnetic scanning principle is used, measurement target 72 has at least one magnetic region whose magnetic field is detected by second scanning unit 60 using a magnetic field sensor (Hall-effect element or MR-sensor) as a sensor element 62.

In the case of an inductive measurement principle, second scanning unit 60 generates an electromagnetic field using an excitation coil, which electromagnetic field induces a voltage in a detection coil used as a sensor element 62. In this case, measurement target 72 has field-attenuating properties which affect the electromagnetic field and thus the amplitude of the voltage induced in the detection coil.

The capacitive measurement principle is based on the fact that measurement target 72 and suitable elements of second scanning unit 60 together form a capacitor, which serves as a sensor element 62 whose capacitance is determined by the position of measurement target 72 relative to second scanning unit 60.

Regardless of the measurement principle, it should be noted that measurement signals MS which are obtained by scanning measurement target 72 using second scanning unit 60 are dependent on the position of measurement target 72 relative to second scanning unit 60. This applies in particular to the distance between measurement target 72 and second scanning unit 60.

Measurement signals MS are fed to analyzing unit 80, where they are processed into digital measurement values M. If, as illustrated in FIG. 1, machine part 70, including measurement target 72, is disposed to be movable in a measurement direction Z relative to second scanning unit 60, then digital measurement values M indicate the position (the distance) or/and changes in position (changes in distance) of measurement target 72 relative to second scanning unit 60.

Alternatively or in addition to a position measurement in direction Z, which, in this example, extends in the axial direction of shaft 5, it is also possible to measure positions or/and changes in position in other spatial directions, for example in a transverse direction X perpendicular to direction Z. Thus, movements in transverse direction X correspond to a parallel displacement of machine part 70 relative to second scanning unit 60. Accordingly, measurement values M indicate displacements of measurement target 72 in transverse direction X. The movements in transverse direction X may be linear movements or movements following a circular path. Thus, measurement values M indicate a length or an angle.

A housing 40 is provided to accommodate scanning unit 14, second scanning unit 60 and the electronic modules, such as position-processing unit 20, interface unit 30 and analyzing unit 80.

Figure 2:
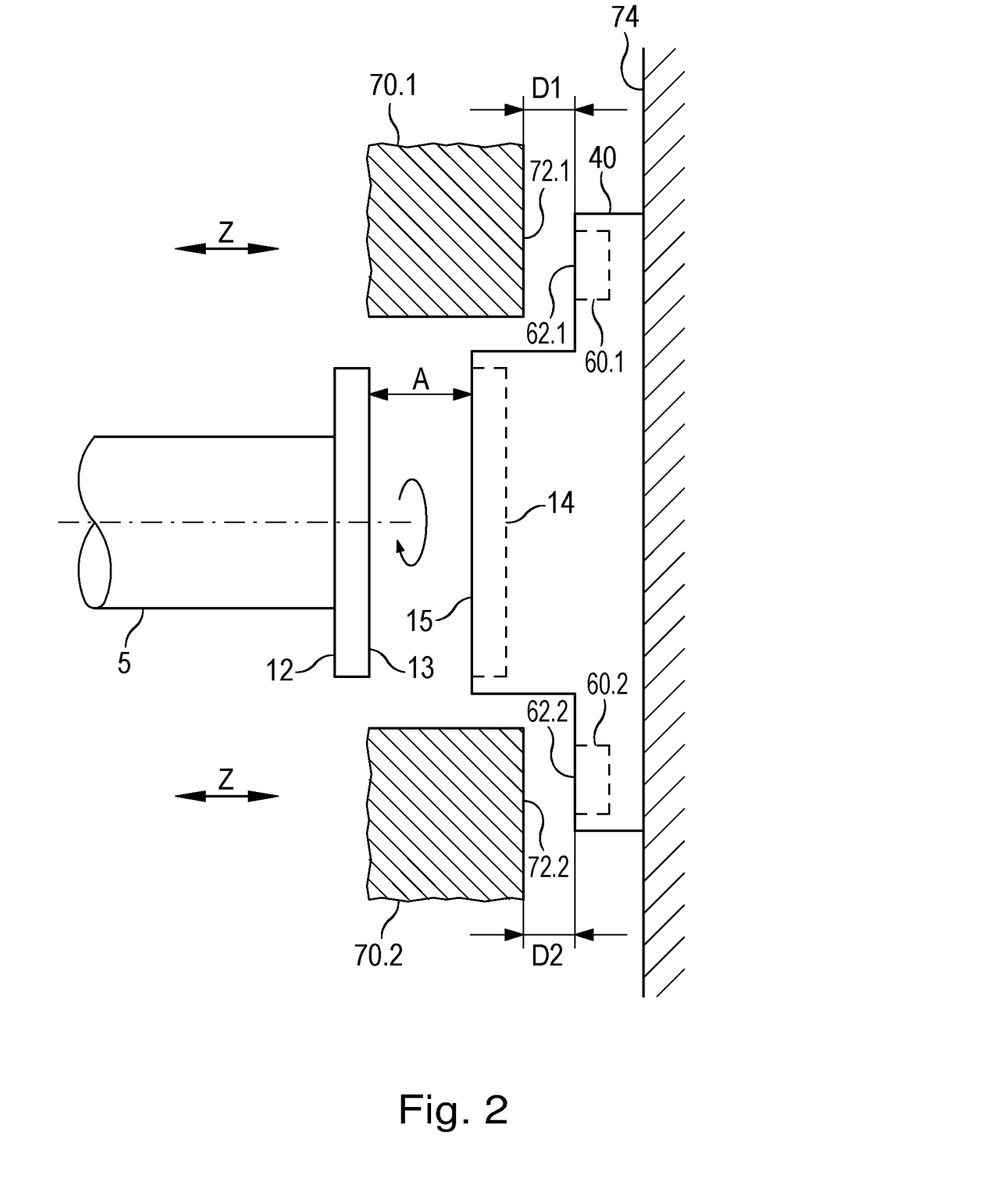
FIG. 2 shows a first exemplary embodiment of a position-measuring device according to the present invention.

FIG. 2 shows a first exemplary embodiment of an inventive position-measuring device in the mounted condition; i.e., graduation carrier 12 is non-rotatably connected to shaft 5, and the housing 40 of the position-measuring device is attached to a stationary machine component 74, for example by a screw connection. Scanning unit 14 for scanning measuring graduation 13 is disposed in housing 40 in known manner on the side facing the graduation carrier 12. Also provided are two second scanning units 60.1, 60.2 which acquire measurement values M indicative of the distances D1, D2 in direction Z from the respective machine parts 70.1, 70.2 associated therewith. The measurement is performed by scanning measuring targets 72.1, 72.1 on machine parts 70.1, 70.2.

Housing 40 further accommodates the electronic modules, such as position-processing unit 20, interface unit 30 and analyzing unit 80. For this purpose, a separate circuit board may be provided. However, in the case that scanning unit 14 and/or second scanning units 60.1, 60.2 already include circuit boards, these modules can also be disposed there. In addition, connectors, terminals, etc. may be provided in or on housing 40.

The machine in which the position-measuring device is installed, may be, for example, an electric motor having an integrated electromagnetic motor brake. In this case, stationary machine component 74 is, for example, part of the motor housing or of a housing frame, shaft 5 is the motor shaft of the electric motor, and machine parts 70.1, 70.2 form part of the electromagnetic motor brake which are moved along direction of movement Z in order to activate or deactivate (release) the brake. Based on distances D1, D2, conclusions can be drawn about the function of the motor brake, for example, about whether the motor brake is activated or deactivated (released). Moreover, by monitoring the distances D1, D2, conclusions can be drawn about the state of wear of brake linings. Machine parts 70.1, 70.2 may be separate components or portions of a single, annular component (e.g., the armature plate of a motor brake).

With regard to the measurement of the angle of rotation of shaft 5 or the number of revolutions made by it, this arrangement is particularly advantageous because scanning distance A (the distance between the sensor elements 15 of scanning unit 14 and the measuring graduation 13 on graduation carrier 12) is substantially constant and, therefore, the position signals PS obtained by scanning the measuring graduation 13 are virtually only dependent on the rotational movement of shaft 5.

In this exemplary embodiment, scanning unit 14 and second scanning units 60.1, 60.2 are independent of each other; i.e. they can be based on different scanning principles.

Figure 3:
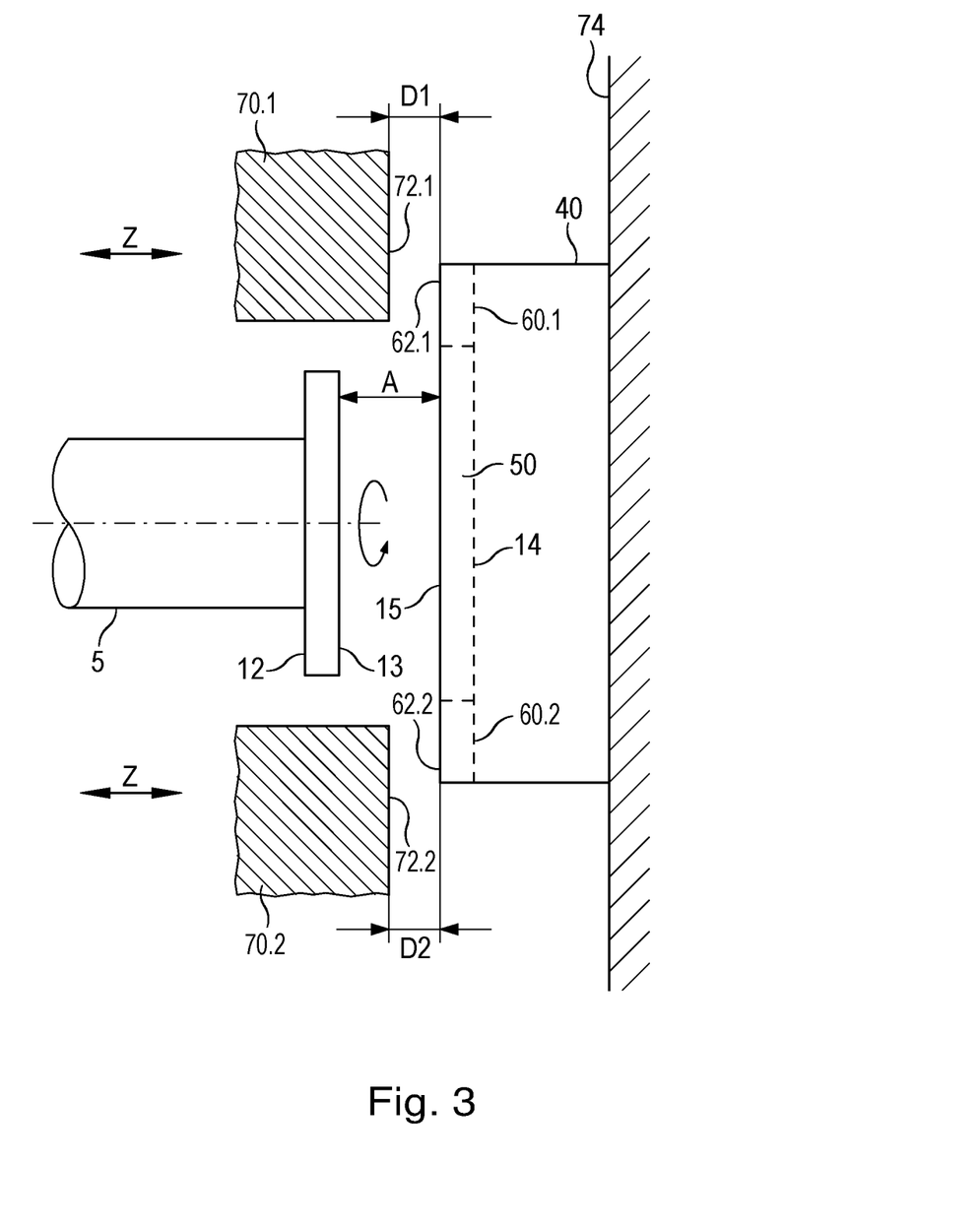
FIG. 3 shows another exemplary embodiment of a position-measuring device according to the present invention.

FIG. 3 shows a further exemplary embodiment of an inventive position-measuring device in the mounted condition. Components already described in connection with the preceding figures have been given the same reference numerals. Unlike the preceding exemplary embodiment, scanning unit 14 and second scanning units 60.1, 60.2 are disposed together on a common carrier element 50. Advantageously, carrier element 50 is a circuit board.

This embodiment is particularly advantageous when an inductive scanning principle is used both in scanning unit 14 and in second scanning units 60.1, 60.2 because, in this case, sensor elements 15, 62.1, 62.2 are coils (receiver coils), and coils (excitation coils) are also required for the generation of the alternating electromagnetic field. Coils can be produced on circuit boards, especially on multilayered circuit boards, in an inexpensive and simple way. In addition, further components of the electrical circuits of scanning units 14, 60.1, 60.2 and possibly of position-processing unit 20, interface unit 30 and analyzing unit 80 may be disposed on carrier element 50, so that only one circuit board is needed.

It is also advantageous to shape the outer contours of carrier element 50 in such a way that it can be used as a cover for housing 40.

Figure 4:
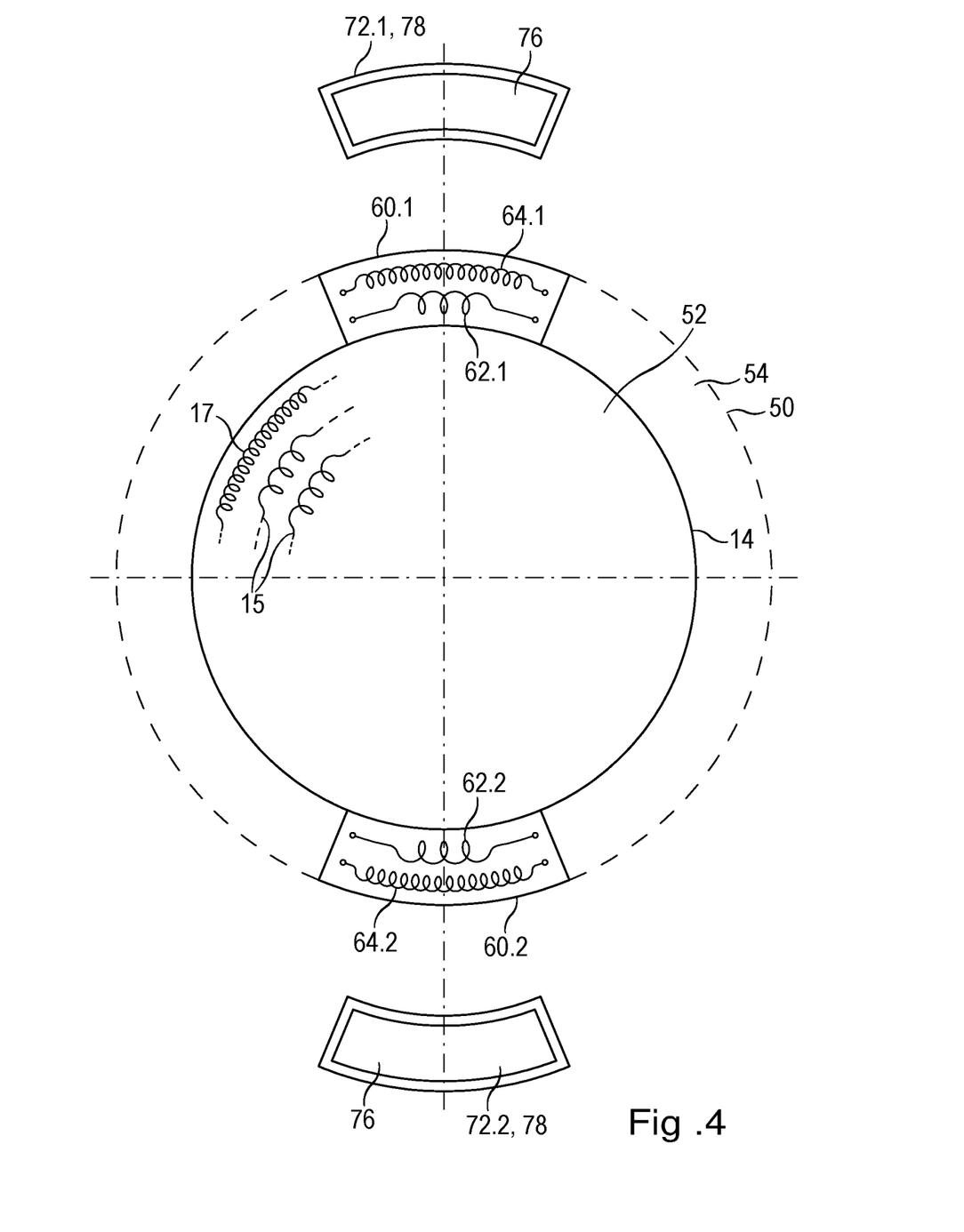
FIG. 4 depicts a carrier element for scanning units of an advantageous embodiment.

FIG. 4 illustrates an advantageous design of a carrier element 50 and corresponding measuring targets 72.1, 72.2, which is based on an inductive measuring principle.

Carrier element 50 includes an inner region 52 in which scanning unit 14 is disposed, and an outer region 54 with two second scanning units 60.1, 60.2.

Disposed in inner region 52 is a plurality of sensor elements 15 in the form of receiver coils, as well as an excitation coil 17. Excitation coil 17 (in conjunction with excitation unit) generates an alternating electromagnetic field which is attenuated as a function of the angular position of shaft 5 or the angular position of the graduation carrier 12 with the measuring graduation 13, which is connected to shaft 5. Accordingly, the voltage induced in receiver coils 15 varies as a function of the angle of rotation, which make position determination possible. In this respect, inner region 52 of carrier element 50 corresponds to the carrier element described in DE 197 51 853 A1.

The second scanning units 60.1, 60.2 in the outer region 54 of carrier element 50 include sensor elements 62.1, 62.2, each having a receiver coil for detection of an alternating electromagnetic field. Here, the receiver coils do not necessarily extend over the entire 360° of the circular disc, but only over the range that is necessary to sense the position of the measurement target 72.1, 72.2 to be measured. In the case of two scanning units 60.1, 60.2, each of these includes, for example, an annular segment covering an angular range of less than 180°, in particular less than 90°. The outer contours of carrier element 50 may be configured to meet the mechanical requirements of housing 40. As indicated by the dashed lines, carrier element 50 is, for example, circular disc-shaped.

The electromagnetic field to be detected by second scanning units 60.1, 60.2 can be generated in at least three different ways:
1. The alternating field to be detected is provided by the alternating field generated in inner region 52, which extends beyond the edge of inner region 52 into and over outer region 54.
2. Excitation coils 64.1, 64.2 are disposed on second scanning units 60.1 60.2 and connected in series with the excitation coils of the inner region 52. In this way, the field-generating circuit is extended over outer region 54.
3. Excitation coils 64.1, 64.2 are disposed on second scanning units 60.1 60.2 and driven by a separate excitation unit to generate the alternating electromagnetic field.

In accordance with the inductive measurement principle, measurement targets 72.1, 72.2 have field-attenuating properties. In this exemplary embodiment, measurement targets 72.1, 72.2 are formed by conductive regions 76 arranged on a carrier element 78, which, analogously to carrier element 50, may be a circuit board. Conductive regions 76 are formed, for example, by copper surfaces. Measurement targets 72.1, 72.2 are connected to machine parts 70.1, 70.2 in a suitable way, for example by adhesive bonding or screwing.

By disposing measurement targets 72.1, 72.2 as separate carrier elements 78, they are made substantially independent of the material and condition of machine part 70.1, 70.2. In addition, it is possible to use different measurement targets 72.1, 72.2 which allow for different measurements of positions or/and changes in position between measurement target 72.1, 72.2 and second scanning unit 60.1, 60.2.

According to the views of FIGS. 1 through 3, second scanning units 60.1 60.2 and the corresponding measurement targets 72.1, 72.2 are disposed opposite each other when in the mounted condition.

In this exemplary embodiment, measurement signals MS are the voltages induced in sensor elements 62.1, 62.2.

Figure 5:
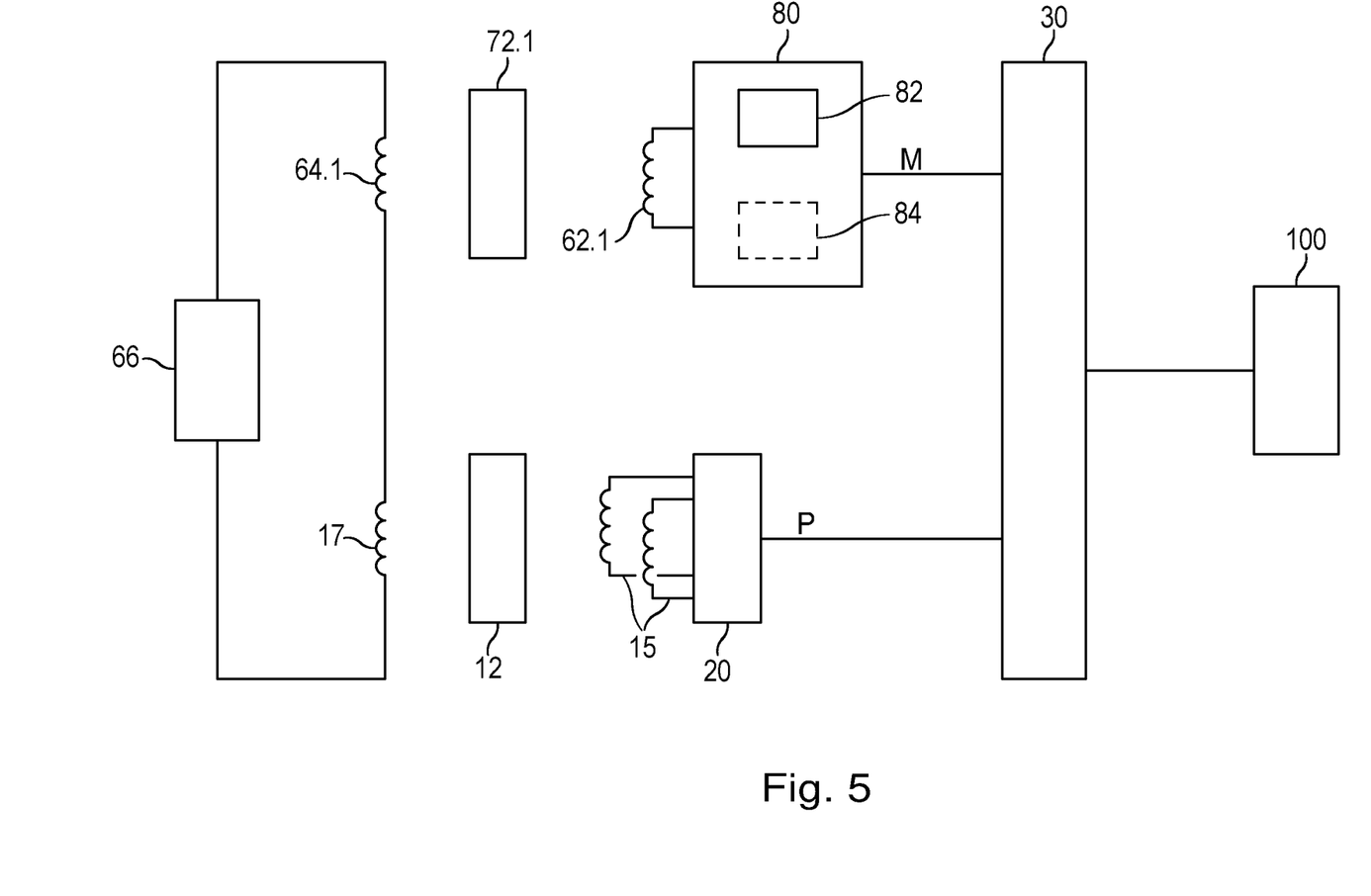
FIG. 5 shows a block diagram of an inventive position-measuring device having a carrier element according to FIG. 4.

FIG. 5 shows a block diagram of an inventive position-measuring device having a carrier element according to FIG. 4. To simplify the diagram, only one second scanning unit 60.1 is shown. However, the circuit can be easily extended to two or more second scanning units.

The field-generating circuit includes excitation coil 17 in inner region 52, which is connected in series with excitation coil 64.1 of second scanning unit 60.1, as well as an excitation unit 66, which forms a resonant circuit with excitation coils 17, 64.1. Excitation unit 66 is suitably configured to excite the resonant circuit in a periodic or pulsed manner, thereby producing an oscillation. To create the resonant circuit, excitation unit 66 includes a capacitor and a switching element for exciting the resonant circuit.

The alternating electromagnetic field is attenuated as a function of position by graduation carrier 12 (including measuring graduation 13) as far as the determination of the angle of rotation of shaft 5 is concerned, and by measurement target 72.1 as far as the determination of the position of machine part 70.1 is concerned. This position-dependent attenuation, in turn, modulates the voltages induced in sensor elements 15 and 62.1.

Position-processing unit 20 processes, in known manner, the voltages induced in sensor elements 15 into position values P indicative of the angular position of shaft 5.

The voltage induced in sensor element 62.1 is fed to analyzing unit 80 as a measurement signal. Analyzing unit 80 includes a first signal processing unit 82, which processes the measurement signal into a measurement value M indicative of the distance D1 between measurement target 72.1 (and thus machine part 70.1) and second scanning unit 60.1.

Analyzing unit 80 may further include a second signal processing unit 84 which performs further analyses of the measurement signal, such as, for example, an analysis in the frequency domain using suitable filtering techniques or frequency analysis (Fourier analysis, etc.). In this way, further measurement values M can be obtained, such as, for example, measurement values M which indicate parameters of vibrations (amplitude and/or frequency) of measurement target 72.1 with respect to second scanning unit 60.1. In the context of the present invention, vibrations are considered to be changes in position.

Prior to feeding the measurement signals to signal-processing units 82, 84, a demodulation may be carried out as a first processing step in the analyzing unit in order to remove the signal components having the fundamental frequency of the alternating electromagnetic field (carrier frequency).

Measurement values M are fed to interface unit 30, from which they may further be output to subsequent electronics 100.

Figure 6:
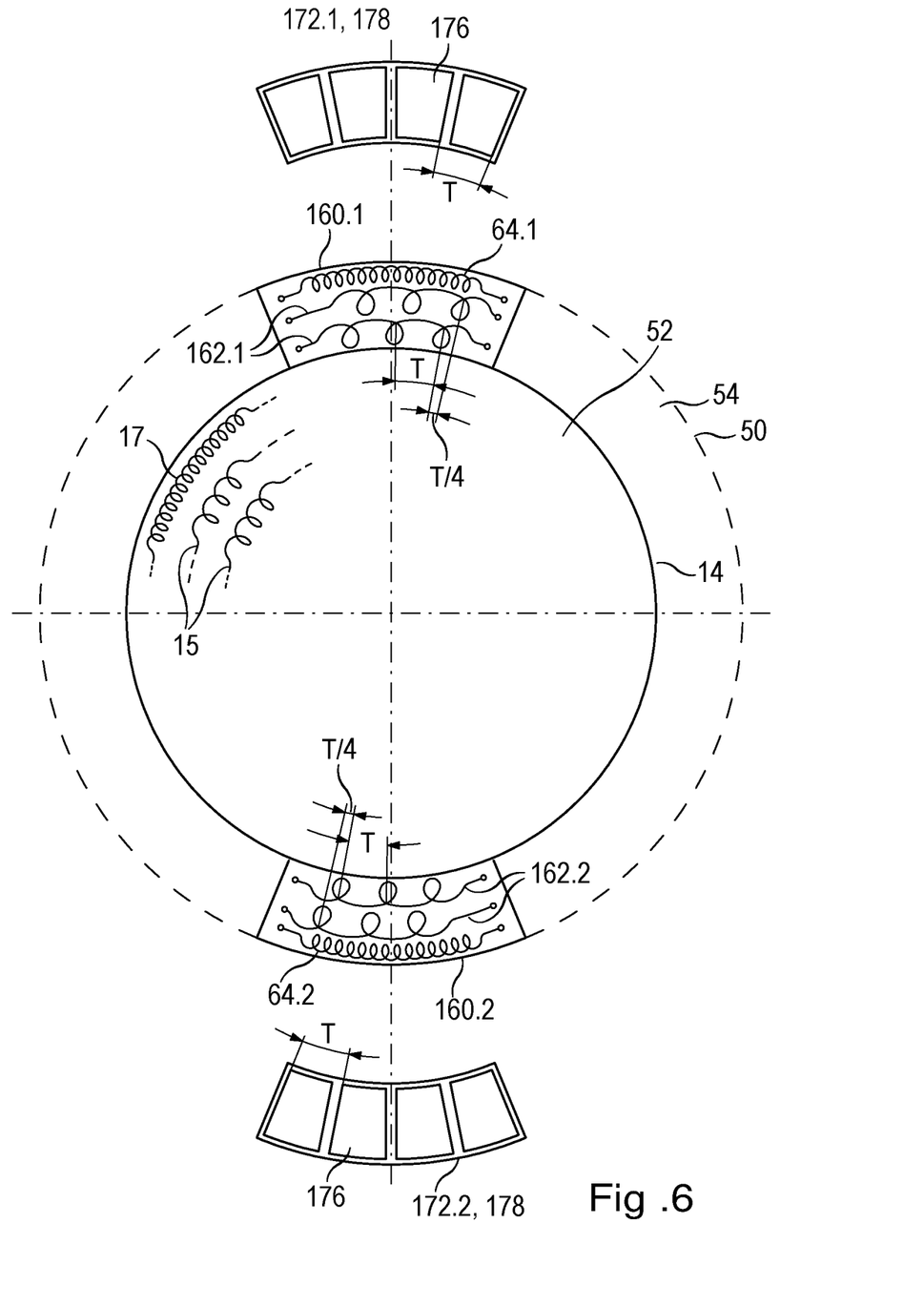
FIG. 6 depicts an alternative carrier element for scanning units of an advantageous embodiment.

FIG. 6 shows another advantageous design of a carrier element 50 and corresponding measuring targets 172.1, 172.2, which is based on an inductive measuring principle.

Inner region 52 corresponds to the inner region of the embodiment of FIG. 4. Furthermore, outer region 54 accommodates two second scanning units 160.1, 160.2.

In this exemplary embodiment, however, sensor elements 162.1, 162.2 of second scanning units 160.1, 160.2 each include two receiver coils for detecting an alternating electromagnetic field.

Measurement targets 172.1, 172.2 are configured as measuring graduation segments; i.e. they have a regular sequence of electrically conductive regions 176 arranged on a carrier element 178.

The arrangement of the conductive regions 176 of the measuring graduation segments of measurement targets 172.1, 172.2 and that of the conductor loops of the receiver coils of sensor elements 162.1, 162.2 have the same period T and follow the transverse direction X, which corresponds to a circular path about the center of carrier element 50 (corresponding to the center of rotation of shaft 5). Moreover, the two receiver coils in each sensor element 162.1, 162.2 are offset by a quarter of period T with respect to each other in the measurement direction of the measuring graduation segments (circumferential direction). Displacements of measurement targets, 172.2 172.1 relative to sensor elements 162.2 162.1 in the measurement direction of the measuring graduation segments (transverse direction X) lead to a modulation of the voltages induced in the receiver coils. When the conductor loops of the receiver coils are suitably configured, the modulation is substantially sinusoidal in each period T and, due to the offset between the two receiver coils, the induced voltages are shifted in phase by 90°.

This design of measurement targets 172.1, 172.2, in conjunction with second scanning units 160.1, 160.2, is particularly advantageous because movements in direction Z of the machine part 70.1, 70.2 to be measured affect the amplitudes of the voltages induced in the receiver coils equally, whereas in the case of movements in transverse direction X, the amplitudes of the induced voltages follow the sinusoidal waveform accordingly. This means that the different directions of movement are distinguishable.

One application in which movements can occur in direction Z and in transverse direction X is the above-mentioned motor brake. During braking, in addition to the movement in direction Z for activating or releasing the brake, the occurring friction produces a force in the radial direction (circumferential direction), which may lead to a change in position of the machine part that is measured by the position-measuring device. Measurement of this change in position allows an assessment of the mechanical condition of the brake.

Figure 7:
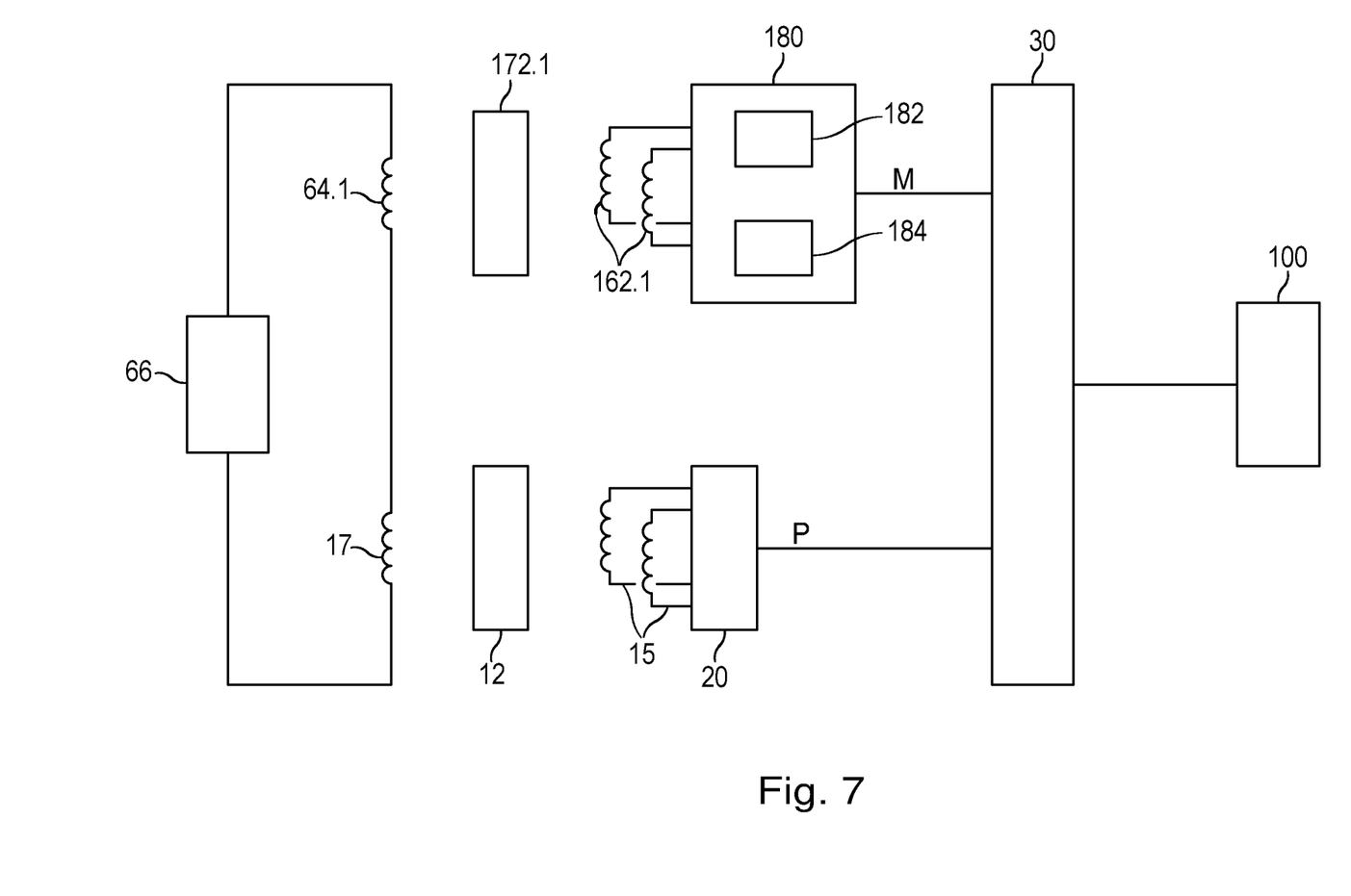
FIG. 7 shows a block diagram of an inventive position-measuring device having a carrier element according to FIG. 6.

FIG. 7 shows a block diagram of an inventive position-measuring device having a carrier element according to FIG. 6. Again, only one second scanning unit 160.1 is shown.

Here, unlike FIG. 5, two sensor elements 162.1 are provided which are offset 90° with respect to one another. The voltages induced therein are fed as measurement signals to analyzing unit 180.

Analyzing unit 180 has a first signal-processing unit 182 which analyzes the measurement signals with respect to the position in direction Z, as well as a second signal-processing unit 184 which analyzes the measurement signals with respect to changes in position in transverse direction X. Here, too, a demodulation is initially carried out so that the measurement signals are present as sine and cosine signals. For further analysis, these may be considered as real and imaginary parts of a complex number. Consequently, first signal-processing unit 182 determines, as a measurement value M, the absolute value of this complex number, which is a measure of the distance D1 between measurement target 172.1 and second scanning unit 160.1 in direction Z. Second signal-processing unit 184 determines, as a measurement value M, the phase angle of the complex number, which indicates a position of measurement target 172.1 relative to scanning unit 160.1 in transverse direction X.

In second signal-processing unit 184, further measurement values M which indicate vibrations (amplitude and/or frequency) of measurement target 172.1, in particular vibrations in transverse direction X, may be determined by analyzing the measurement signals in the frequency domain using suitable filtering techniques or frequency analysis (Fourier analysis, etc.).

The motor brake mentioned above can be used as an example here as well because vibrations in transverse direction X can occur in particular during braking.

The present invention is of course not limited to the specific embodiments described herein, but rather may be modified by those skilled in the art for a great variety of measurement tasks within the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device, comprising:
a graduation carrier which is non-rotatably connectable to a shaft and has a measuring graduation that is disposed radially about an axis of rotation of the shaft in a mounted state of the graduation carrier;
a first scanner configured to generate position signals by scanning the measuring graduation;
a position-processor configured to process the position signals into absolute, digital position values;
an interface configured to communicate with subsequent electronics;
at least one second scanner disposed in a same housing as the first scanner and configured to generate measurement signals that are dependent on a position of a machine part and indicate a distance between a measurement target and the at least one second scanner in a first direction by scanning the measurement target on the machine part, the machine part being a different part from the shaft; and
an analyzer configured to process the measurement signals into at least one measurement value indicative of a position and/or a change in the position of the measurement target relative to the at least one second scanner, and to output the at least one measurement value to the interface.

2. The position-measuring device as recited in claim 1, wherein the at least one measurement value determined in the analyzer further indicates at least one of:
- a displacement of the measurement target parallel to the at least one second scanner in a transverse direction; and
- parameters of vibrations of the measurement target with respect to the at least one second scanner.

3. The position-measuring device as recited in claim 1, wherein the housing further accommodates the position-processor, the interface and the analyzer.

4. The position-measuring device as recited in claim 1, wherein the first scanner and the at least one second scanner are disposed together on a common carrier element.

5. The position-measuring device as recited in claim 4, wherein the first scanner and the at least one second scanner are configured in accordance with an inductive measurement principle and each have sensor elements in a form of receiver coils for detecting an alternating electromagnetic field, and wherein the measurement target has field-attenuating properties.

6. The position-measuring device as recited in claim 5, wherein the measurement target includes a carrier element on which at least one conductive region is disposed.

7. The position-measuring device as recited in claim 5, wherein the measurement target is configured as a measuring graduation segment, and a plurality of conductive regions are arranged on a carrier element according to a period in a transverse direction, and wherein the sensor elements of the at least one second scanner each include two receiver coils whose conductor loops are also arranged according to the period in the transverse direction, the two receiver coils being offset by a quarter of the period with respect to each other in the transverse direction.

8. The position-measuring device as recited in claim 1, wherein the first direction is parallel to the axis of rotation of the shaft.

9. The position-measuring device as recited in claim 1, wherein the machine part is an armature plate of a brake.

10. A method comprising:
operating a position-measuring device, the position-measuring device comprising:
- a graduation carrier which is non-rotatably connectable to a shaft and has a measuring graduation that is disposed radially about an axis of rotation of the shaft in a mounted state of the graduation carrier;
- a first scanner configured to generate position signals by scanning the measuring graduation;
- a position-processor configured to process the position signals into absolute, digital position values;
- an interface configured to communicate with subsequent electronics;
- at least one second scanner disposed in a same housing as the first scanner and configured to generate measurement signals that are dependent on a position of a machine part and indicate a distance between a measurement target and the at least one second scanner in a first direction by scanning the measurement target on the machine part, the machine part being a different part from the shaft; and
- an analyzer configured to process the measurement signals into at least one measurement value indicative of a position and/or a change in the position of the measurement target relative to the at least one second scanner, and to output the at least one measurement value to the interface.

11. The method as recited in claim 10, wherein the at least one measurement value determined in the analyzer further indicates at least one of:
- a displacement of the measurement target parallel to the at least one second scanner in a transverse direction; and
- parameters of vibrations of the measurement target with respect to the at least one second scanner.

12. A method for position determination, the method comprising:
- providing a graduation carrier which is non-rotatably connected to a shaft and has a measuring graduation that is disposed radially about an axis of rotation of the shaft;
- generating, by a first scanner, position signals by scanning the measuring graduation;
- processing the position signals into absolute, digital position values;
- generating, by at least one second scanner disposed in a same housing as the first scanner, measurement signals that are dependent on a position of a machine part and indicate a distance between a measurement target and the at least one second scanner in a first direction parallel to the axis of rotation of the shaft by scanning the measurement target on the machine part, the machine part being a different part from the shaft;
- processing the measurement signals into at least one measurement value indicative of a position and/or a change in the position of the measurement target relative to the at least one second scanner; and
- outputting the at least one measurement value to subsequent electronics.

\* \* \* \* \*